US012650891B2

(12) United States Patent
Uribe et al.

(10) Patent No.: US 12,650,891 B2
(45) Date of Patent: *Jun. 9, 2026

(54) COMMAND ADDRESS FAULT DETECTION

(71) Applicant: Micron Technology, Inc., Boise, ID (US)

(72) Inventors: Melissa I. Uribe, El Dorado Hills, CA (US); Steffen Buch, Munich (DE)

(73) Assignee: Micron Technology, Inc., Boise, ID (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/817,713

(22) Filed: Aug. 28, 2024

(65) Prior Publication Data

US 2024/0419542 A1 Dec. 19, 2024

Related U.S. Application Data

(63) Continuation of application No. 17/820,120, filed on Aug. 16, 2022, now Pat. No. 12,079,078.

(51) Int. Cl.
*G06F 11/07* (2006.01)
(52) U.S. Cl.
CPC ................................. *G06F 11/0772* (2013.01)
(58) Field of Classification Search
CPC .................................................. G06F 11/0772
See application file for complete search history.

(56) References Cited

U.S. PATENT DOCUMENTS

| | | | | |
|---|---|---|---|---|
| 12,079,078 | B2 * | 9/2024 | Uribe | ................... G06F 11/1068 |
| 12,242,343 | B2 * | 3/2025 | Uribe | ................... G06F 11/1068 |
| 2009/0119567 | A1 | 5/2009 | Kawabata | |
| 2009/0313533 | A1 | 12/2009 | Bains | |
| 2017/0004035 | A1 * | 1/2017 | Suh | ......................... G11C 29/52 |
| 2017/0147213 | A1 | 5/2017 | Amidi et al. | |
| 2017/0177247 | A1 * | 6/2017 | Hu | ......................... G06F 3/0659 |
| 2018/0052732 | A1 | 2/2018 | Jo et al. | |
| 2018/0061478 | A1 * | 3/2018 | Vergis | ................... G11C 7/1045 |
| 2018/0219562 | A1 | 8/2018 | Lee et al. | |
| 2018/0246665 | A1 * | 8/2018 | Wang | ................... G06F 3/0673 |
| 2019/0051370 | A1 | 2/2019 | Azam et al. | |
| 2020/0233739 | A1 | 7/2020 | Oh | |
| 2021/0141687 | A1 | 5/2021 | Song | |
| 2021/0350870 | A1 | 11/2021 | Ware et al. | |
| 2023/0098515 | A1 | 3/2023 | Nakasato et al. | |
| 2024/0061744 | A1 | 2/2024 | Uribe et al. | |

* cited by examiner

*Primary Examiner* — Joseph D Torres
(74) *Attorney, Agent, or Firm* — Harrity & Harrity, LLP

(57) ABSTRACT

A memory device may receive, from a host device via a command address (CA) bus, a plurality of CA bits associated with a command signal or an address signal. The memory device may receive, from the host device via the CA bus, a first set of parity bits that is based on the plurality of CA bits and a select parity generation process. The memory device may generate a second set of parity bits, based on the plurality of CA bits, using the select parity generation process. The memory device may compare the first set of parity bits and the second set of parity bits. The memory device may selectively transmit an alert signal to the host device based on comparing the first set of parity bits and the second set of parity bits.

20 Claims, 6 Drawing Sheets

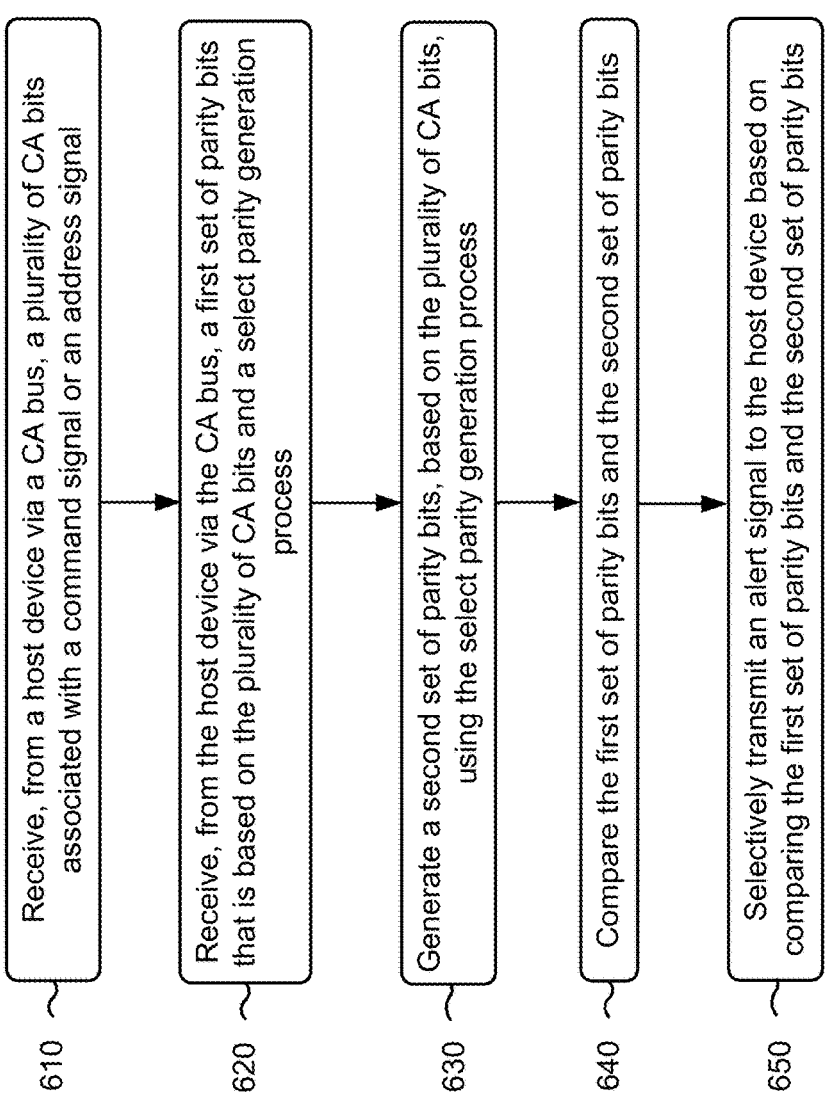

610 — Receive, from a host device via a CA bus, a plurality of CA bits associated with a command signal or an address signal 620 — Receive, from the host device via the CA bus, a first set of parity bits that is based on the plurality of CA bits and a select parity generation process 630 — Generate a second set of parity bits, based on the plurality of CA bits, using the select parity generation process 640 — Compare the first set of parity bits and the second set of parity bits 650 — Selectively transmit an alert signal to the host device based on comparing the first set of parity bits and the second set of parity bits

COMMAND ADDRESS FAULT DETECTION

RELATED APPLICATION

This application is a continuation of U.S. patent application Ser. No. 17/820,120, filed Aug. 16, 2022, which is incorporated herein by reference in its entirety.

TECHNICAL FIELD

The present disclosure generally relates to memory devices, memory device operations, and, for example, to command address fault detection.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

BRIEF DESCRIPTION OF THE DRAWINGS

FIG. 6 is a flowchart of an example method associated with command address fault detection.

DETAILED DESCRIPTION

Figure 1:
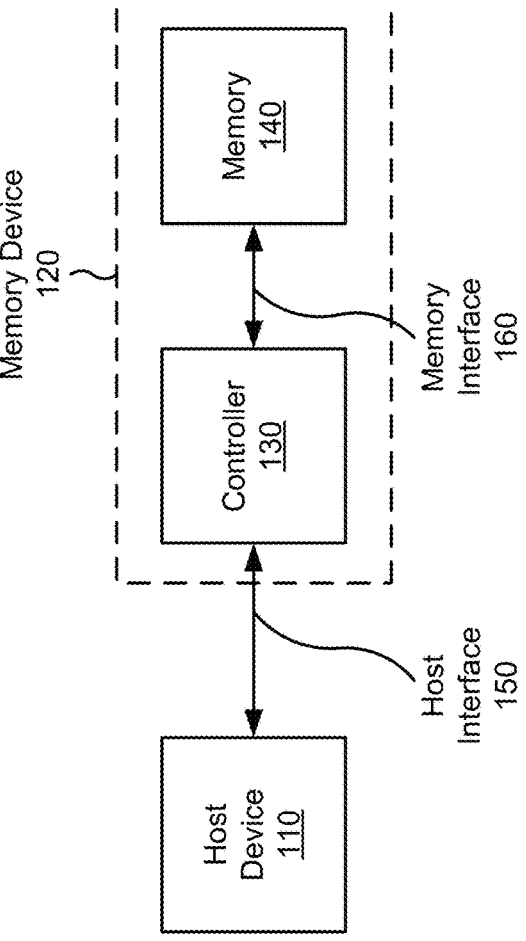
FIG. 1 is a diagram illustrating an example system capable of command address fault detection.

A system may include a memory device and a host device, which may communicate with one another using a bus. Different packages (e.g., packages that vary in size, density, architecture, other aspects, or any combination thereof) may be used to contain the memory device. A package that contains the memory device may include multiple pins that are coupled with the bus and provide access to and from components within the memory device. In some examples, one or more of the pins may be coupled with data lines of the bus and one or more of the pins may be coupled with control lines of the bus.

In some examples, the system (e.g., the host device, the memory device, or both the host device and the memory device together) may be configured to satisfy a failure rate metric. For example, the system may be configured so that a Failure in Time (FIT) rate (e.g., a number of failures that are expected to occur in one billion hours for the system) is below a threshold. In some cases, faults in the packaging of the memory device that affect a command/address (CA) bus, a clock, or control signals in the silicon may result in undetected failures. An undetected failure may occur when the memory device does not receive a command, does not recognize a command, reads from a wrong address, or writes to a wrong address, among other examples. In some cases, to satisfy the failure rate metric, the system may employ data reliability techniques that reduce such failures by enabling the host device and/or the memory device to detect, correct, or discard erroneous or invalid data, or any combination thereof. However, some of these data reliability techniques may not be able to identify command or address related errors. For example, certain error-correcting code (ECC) schemes may be able to detect and correct errors that occur within the data path, but may not be able to detect or correct errors that occur on the CA bus (e.g., since the memory device may not receive the command that includes the error).

In some cases, the memory device may need to have an undetected FIT rate (e.g., a FIT rate for undetected failures) that is below the threshold or below another threshold. In automotive applications, such as in the example of autonomous vehicles, the undetected FIT rate for the memory device may need to be less than 0.4 FIT. However, FIT rates experienced by some memory devices may not satisfy this threshold (e.g., the memory devices may have FIT rates that are greater than the threshold). For example, command faults in the memory device may contribute 1 FIT, gross faults that affect the ability of the memory device to receive commands may contribute 7 FIT, and address faults may contribute 8 FIT. These example faults (among other faults) may result in no drive (e.g., the memory device not performing a read), wrong data (e.g., the memory device reading from a wrong address), lost data (e.g., the memory device not performing a write, or writing to the wrong location), or outputs at termination or Hi-Z. This may be especially problematic in the case of autonomous vehicles, where an error in the memory device may decrease the safety of the vehicle.

Some techniques described herein enable fault detection, and in particular, detection of faults associated with a CA bus. A host device may generate a CA word (e.g., a plurality of bits) associated with a command signal or an address signal. The host device may generate a first set of parity bits based on the CA word using a select parity generation process (e.g., parity generation function) that is common to the host device and the memory device. The host device may transmit the CA word and the first set of parity bits to the memory device via the CA bus. For example, the host device may transmit the CA word via the CA bus during two or more intervals and may transmit the first set of parity bits via the CA bus during one or more other unit intervals. In another example, the host device may transmit one or more parity bits of the first set of parity bits using one or more spare bits of the CA bus. The memory device may generate a second set of parity bits based on the CA word using the parity generation process that is common to the host device and the memory device, and may compare the first set of parity bits and the second set of parity bits. The memory device may selectively transmit an alert signal to the host device (e.g., via an alert pin) based on comparing the first set of parity bits and the second set of parity bits. In some implementations, the alert signal may be associated with a fail flag, and the memory device may activate the fail flag based on the first set of parity bits not matching the second set of parity bits. In other implementations, the alert signal may be associated with a valid flag, and the memory device may activate the valid flag based on the first set of parity bits matching the second set of parity bits. The host device may initiate a corrective action, such as a safety procedure, based on identifying that the CA word is invalid (e.g., based on the fail flag being activated or based on the valid flag not being activated within a time period). In the example automotive application, the host device may cause the autonomous vehicle to pull to the side of a road or to alert a driver of the vehicle to take manual control. In another example, the host device may attempt another transmission of the CA word to the memory device. The techniques described herein may improve the FIT rate for the system, such as by increasing the detection of errors associated with the CA bus, thereby improving the safety and reliability of the system.

FIG. 1 is a diagram illustrating an example system 100 capable of command address fault detection. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component. In some implementations, the host device 110 may be or may be included in automotive applications, such as autonomous vehicles.

The memory device 120 may be any electronic device configured to store data in memory. In some implementations, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM. In some implementations, the memory 140 may include non-volatile memory configured to maintain stored data after the memory device 120 is powered off, such as NAND memory or NOR memory. For example, the non-volatile memory may store persistent firmware or other instructions for execution by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components.

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

As indicated above, FIG. 1 is provided as an example. Other examples may differ from what is described with regard to FIG. 1.

Figure 2:
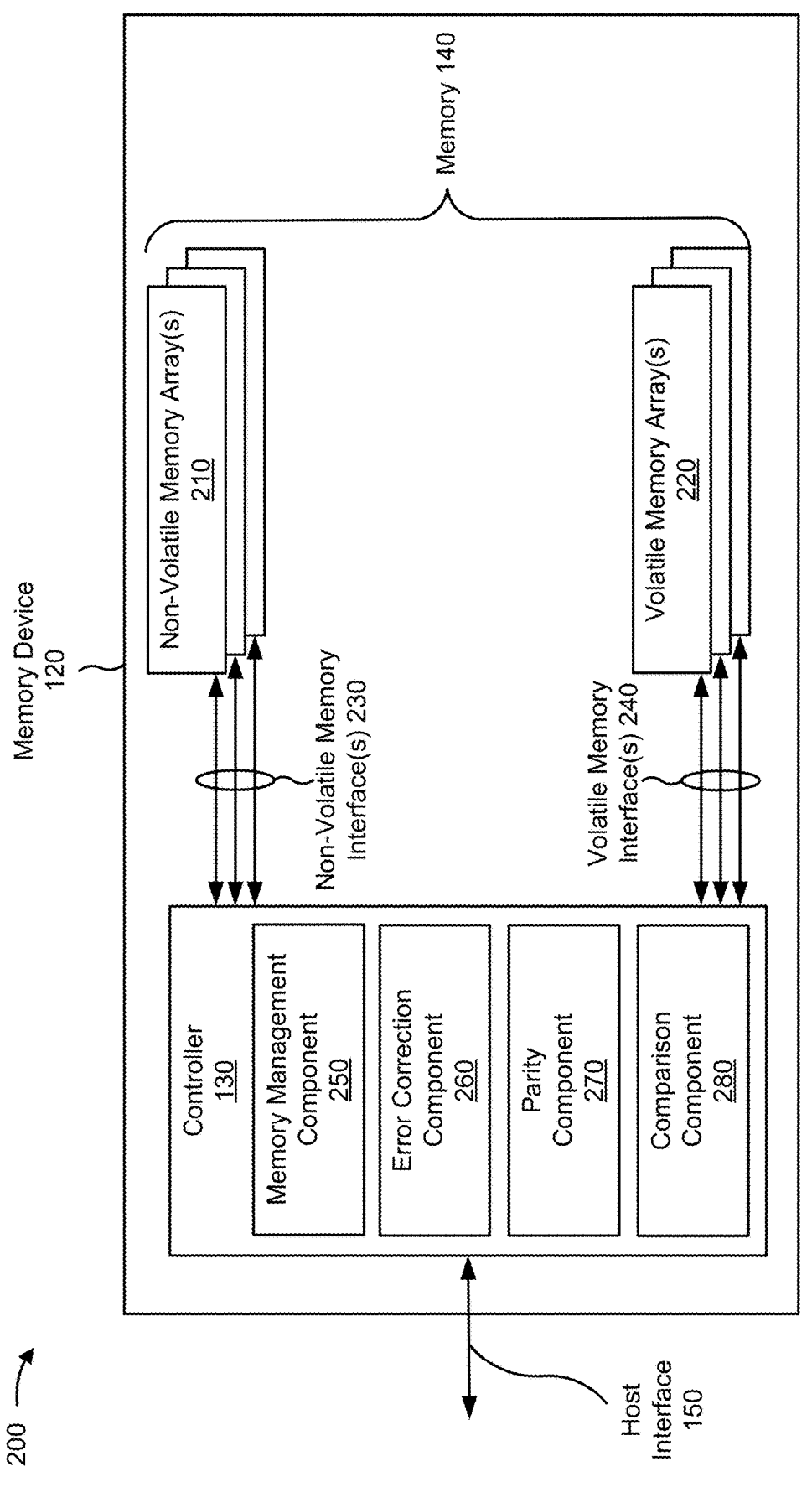
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, an error correction component 260, a parity component 270, and/or a comparison component 280. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The error correction component 260 may be configured to detect and/or correct errors associated with the memory device 120. For example, the error correction component 260 may be configured to detect and/or correct an error associated with writing data to or reading data from one or more memory cells of a memory array, such as a single-bit error (SBE) or a multi-bit error (MBE). In some implementations, the error correction component 260 may use an on-die error-correcting code (ECC) to detect and/or correct the errors associated with the memory device 120. The on-die ECC may mask the SBEs of the memory device 120. For example, when the on-die ECC is enabled, the error detection component 260 may detect and/or correct MBEs only. Alternatively, when the on-die ECC is disabled, the error detection component 260 may detect and/or correct both SBEs and MBEs. In some cases, the ECC may be an inline ECC, which means that the ECC codes are stored on the memory device 120 with the data that is to be tested.

The parity component 270 may be configured to generate one or more parity bits. The parity component 270 may generate the one or more parity bits based on a CA word that is received from the host device 110, such as a CA word that is generated by the CA component 330 (described below). The parity component 270 may generate the parity bits, based on the CA word, using any type of parity generation technique or algorithm. For example, the parity component 270 may generate the parity bits by applying a Hamming Code or a cyclic redundancy check (CRC) algorithm to the CA word, among other examples. As described in more detail herein, the CA word may be received by the memory device 120 in multiple unit intervals. A unit interval may correspond to a clock cycle of the system 100, such as a clock cycle associated with the memory device 120. For example, the CA word may be received by the memory device 120 in four unit intervals, and one or more bits of the CA word may be received at each unit interval. The parity component 270 may generate the one or more parity bits based on the CA word, such as the entirety of the CA word after the CA word is received over the multiple unit intervals.

The comparison component 280 may be configured to compare parity bits. For example, the comparison component 280 may compare a first set of parity bits, such as the parity bits generated by the parity component 270 associated with the memory device 120, and a second set of parity bits, such as parity bits generated by the parity component 340 associated with the host device 110 (described below). The comparison component 280 may determine whether the CA word received by the memory device 120 is valid based on comparing the first set of parity bits with the second set of parity bits. The comparison component 280 may determine that the CA word received by the memory device 120 is valid based on the first set of parity bits matching (e.g., being identical to) the second set of parity bits. Alternatively, the comparison component 280 may determine that the CA word received by the memory device 120 is invalid (e.g., has one or more errors) based on the first set of parity bits not matching (e.g., not being identical to) the second set of parity bits. In one example, if the first set of parity bits includes the bits 101010, and the second set of parity bits includes the bits 101010, the comparison component 280 may determine that the CA word received by the memory device 120 is valid. Alternatively, if the first set of parity bits includes the bits 101010, and the second set of parity bits includes the bits 100010, the comparison component 280 may determine that the CA word received by the memory device 120 is invalid. In some implementations, the comparison component 280 may be configured to activate a flag based on comparing the parity bits. In some examples, the comparison component 280 may activate a fail flag based on the first set of parity bits not matching the second set of parity bits. In other examples, the comparison component 280 may activate a valid flag based on the first set of parity bits matching the second set of parity bits. Additional details are described below.

Figure 4:
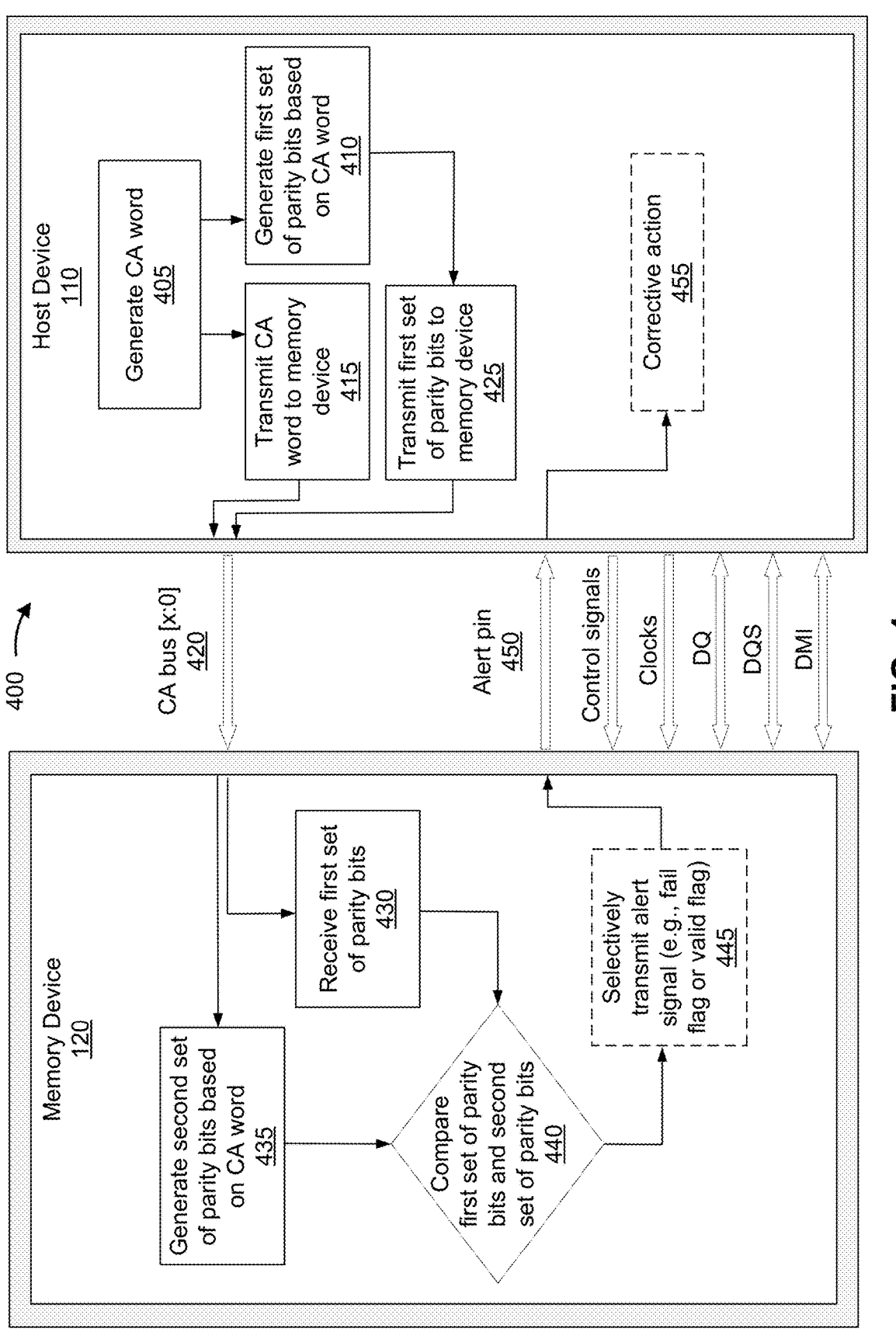
FIG. 4 is a diagram illustrating an example of command address fault detection.

One or more devices or components shown in FIG. 2 may be used to carry out operations described elsewhere herein, such as one or more operations of FIG. 4 and/or one or more process blocks of the methods of FIG. 6. For example, the controller 130, the parity component 270, and/or the comparison component 280 may perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
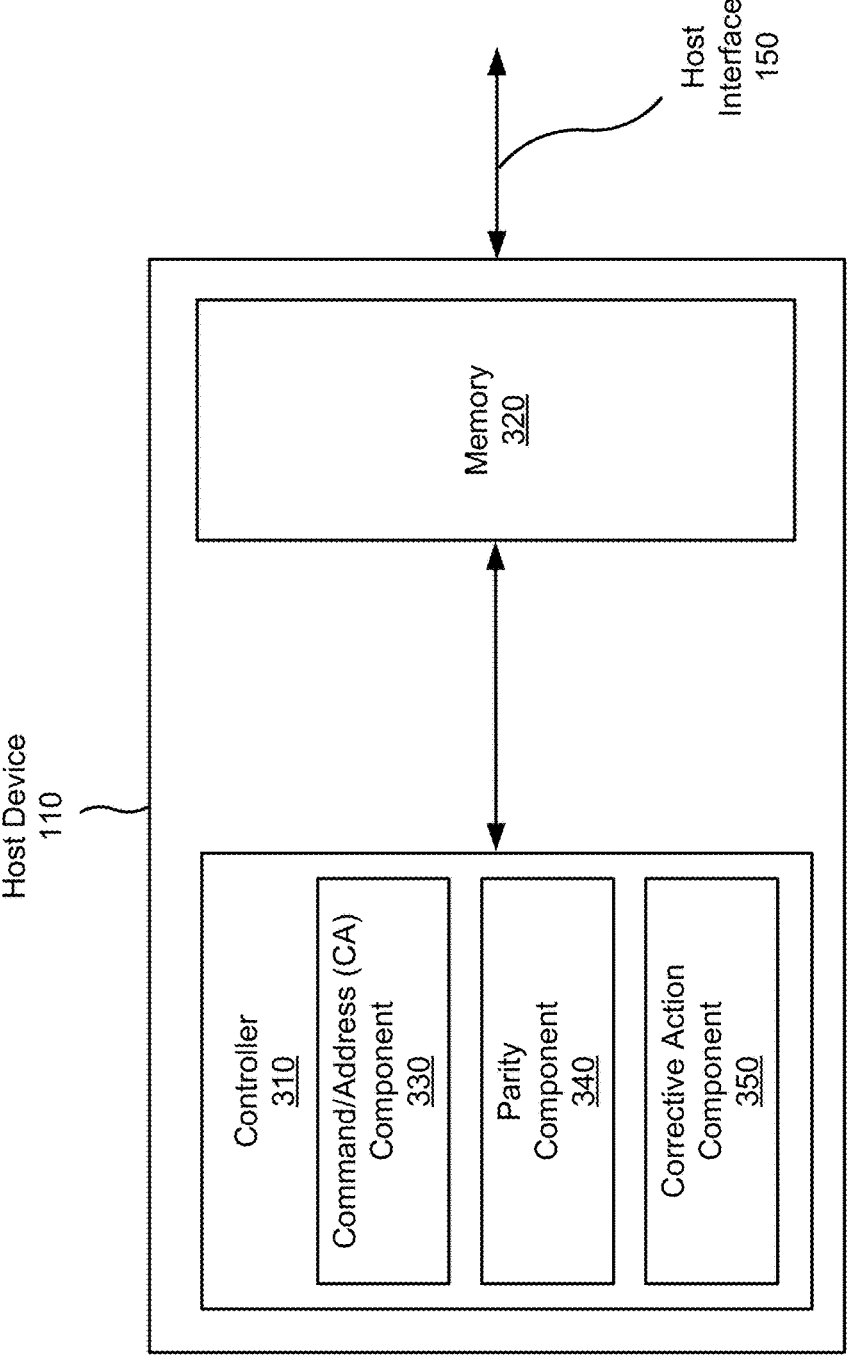
FIG. 3 is a diagram of example components included in a host device.

FIG. 3 is a diagram of example components included in a host device 110. The host device 110 may include a controller 310 and memory 320. The controller 310 associated with the host device 110 may include some or all of the features of the controller 130 associated with the memory device 120. Additionally, or alternatively, the memory 320 associated with the host device 110 may include some or all of the features of the memory 140 associated with the memory device 120.

The controller 310 may control operations of the memory 320, such as by executing one or more instructions. For example, the host device 110 may store one or more instructions in the memory 320, and the controller 310 may execute those one or more instructions. Additionally, or alternatively, the controller 310 may receive one or more instructions from the memory device 120 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 310. The controller 310 may execute the set of instructions to perform one or more operations or methods described herein. In some implementations, execution of the set of instructions, by the controller 310, causes the controller 310 and/or the host device 110 to perform one or more operations or methods described herein. In some implementations, hardwired circuitry is used instead of or in combination with the one or more instructions to perform one or more operations or methods described herein. Additionally, or alternatively, the controller 310 and/or one or more components of the host device 110 may be configured to perform one or more operations or methods described herein.

As shown in FIG. 3, the controller 310 may include a CA component 330, a parity component 340, and/or a corrective action component 350. In some implementations, one or more of these components are implemented as one or more instructions (e.g., firmware) executed by the controller 310. Alternatively, one or more of these components may be implemented as dedicated integrated circuits distinct from the controller 310.

The CA component 330 may be configured to generate a CA word. The CA word may include multiple bits and may be associated with an instruction, such as a read command or a write command, that is to be transmitted to the memory device 120. The CA word may be transmitted to the memory device 120 using one or more CA buses used for communicating data between the host device 110 and the memory device 120. For example, the CA word may be transmitted to the memory device 120 using multiple CA buses and over multiple unit intervals, as described herein. The CA word may have any length, such as any number of bits that are needed to convey the instruction to the memory device 120.

The parity component 340 may be configured to generate one or more parity bits. The parity component 340 may generate the one or more parity bits based on a CA word, such as the CA word that is generated by the CA component 330. The parity component 340 may generate the parity bits, based on the CA word, using any type of parity generation technique or algorithm. For example, the parity component 340 may generate the parity bits by applying a Hamming Code or a CRC algorithm to the CA word, among other examples. The parity component 340 associated with the host device 110 may include some or all of the features of the parity component 270 associated with the memory device 120. For example, the parity component 340 may use the same parity generation process, technique or algorithm as the parity component 270 for generating parity bits, as described in more detail herein.

The corrective action component 350 may be configured to initiate one or more corrective actions, such as one or more safety procedures, based on identifying that the CA word is invalid. For example, the corrective action component 350 may initiate the one or more corrective actions based on the memory device 120 activating a fail flag or based on the memory device 120 not activating a valid flag within a time period. Additional details regarding these features are described in connection with FIG. 4. In some implementations, the invalid CA word may result from the memory device 120 not receiving a command or not recognizing the command. This may result in the memory device 120 and/or the system 100 experiencing one or more errors. For example, the invalid CA word may result in the memory device 120 reading from a wrong address or writing to the wrong address. In the example of autonomous vehicles, the invalid CA word may decrease the safety of the vehicle associated with the memory device 120. In this case, the corrective action component 350 may initiate one or more safety procedures, such as causing the autonomous vehicle to pull to the side of a road, to alert a driver of the vehicle to take manual control, or to initiate a restart or shut down procedure (e.g., if the vehicle is not currently being used). In another example, the corrective action component 350 may cause the host device 110 to attempt another transmission of the CA word to the memory device 120. This may improve the likelihood that the memory device 120 properly receives the CA word if the error occurred during the transmission over the CA bus and/or if the error was transient in nature. In this case, the system 100 may continue to operate without interruption.

One or more devices or components shown in FIG. 3 may be used to carry out operations described elsewhere herein, such as one or more operations of FIG. 4 and/or one or more process blocks of the methods of FIG. 6. For example, the controller 310, the parity component 340, and/or the corrective action component 350 may perform one or more operations and/or methods for the host device 110.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more operations described as being performed by another set of components shown in FIG. 3.

As indicated above, FIG. 3 is provided as an example. Other examples may differ from what is described with regard to FIG. 3.

FIG. 4 is a diagram illustrating an example of CA fault detection. As shown in FIG. 4, a host device 110 and a memory device 120 may communicate. The memory device 120 may include a controller 130 and a memory 140. The controller 130 may include a memory management component 250, an error correction component 260, a parity component 270, and/or a comparison component 280, among other examples. The host device 110 may include a controller 310 and a memory 320. The controller 310 may include a CA component 330, a parity component 340, and/or a corrective action component 350, among other examples.

As shown by reference number 405, the host device 110 may generate a CA word that includes a plurality of bits. For example, the CA component 330 associated with the host device 110 may generate the CA word. The CA word may be associated with an instruction, such as a read command or a write command that is to be transmitted to the memory device 120. For example, the CA word may be an instruction to the memory device 120 to read one or more bits of data from a particular memory section of the memory device 120. Additionally, or alternatively, the CA word may be an instruction to the memory device 120 to write one or more bits of data to a particular memory section of the memory device 120. The CA word may have any length, such as any number of bits that are needed to convey the instruction to the memory device 120.

As shown by reference number 410, the host device 110 may generate a first set of parity bits. For example, the parity component 340 associated with the host device 110 may generate the first set of parity bits. The parity component 340 may generate the first set of parity bits based on a CA word, such as the CA word generated by the CA component 330. The first set of parity bits may include any number of parity bits. For example, the parity component 340, to generate the first set of parity bits, may generate any number of parity bits (e.g., four parity bits or six parity bits) based on the CA word.

In some implementations, the host device 110 and/or the parity component 340 may generate the first set of parity bits, based on the CA word, using any type of parity generation technique or algorithm. In one example, the parity component 340 may generate the first set of parity bits by applying a Hamming Code to the CA word. Applying the Hamming Code to the CA word may include generating three parity bits for each four bits of the CA word. The host device 110 and/or the memory device 120 may detect an error based on any one of the seven bits being corrupted during transmission. In another example, the parity component 340 may generate the first set of parity bits by applying a CRC algorithm to the CA word. Applying the CRC algorithm to the CA word may include calculating a check value to be added to one or more CA word portions (e.g., every certain number of CA word bits). The calculation may be repeated by the memory device 120 when the CA word is received by the memory device 120, and in the event that the check values do not match, corrective action can be taken against the data corruption. However, as described herein, any type of parity generation technique or algorithm may be used to generate the parity bits based on the CA word.

As shown by reference number 415, the host device 110 may transmit the CA word to the memory device 120. The host device 110 may transmit the CA word to the memory device 120 via the CA bus 420. In some implementations, the CA bus 420 may include a number of CA pins. For example, CA bus [x:0] may include x CA pins for transmitting the CA word from the host device 110 to the memory device 120. In some implementations, the host device 110 may transmit a single bit of the CA word, per CA pin, over a plurality of unit intervals. Thus, for each CA pin used for communicating the CA word between the host device 110 and the memory device 120, one bit of the CA word may be transmitted per unit interval. In an example where the CA word is sixteen bits, and the CA bus 420 includes four CA pins, four bits of the CA word (one bit per pin) may be transmitted from the host device 110 to the memory device 120 during each unit interval. Thus, the transmission of the CA word from the host device 110 to the memory device may be complete after four clock cycles.

As shown by reference number 425, the host device 110 may transmit the first set of parity bits. The host device 110 may transmit the first set of parity bits to the memory device 120 via the CA bus 420. In some implementations, the first set of parity bits may be transmitted separately from the CA word. For example, the CA word may be sent via the CA bus 420 during two or more unit intervals, and the first set of parity bits may be sent via the CA bus 420 during one or more other unit intervals (e.g., after the transmission of the CA word is complete). In the example described above, the CA bus 420 may include four CA pins, the CA word may include sixteen CA bits, and the first set of parity bits may include four parity bits. The host device 110 may transmit the CA word, using the four CA pins of the CA bus 420, during a first four unit intervals. For example, four CA bits of the CA word (e.g., one CA bit for each CA pin) may be transmitted during each unit interval of the first four unit intervals. Additionally, the host device 110 may transmit the four parity bits of the first set of parity bits during a single unit interval (e.g., one parity bit per CA pin). The four parity bits may be transmitted in a fifth unit interval, such as after the transmission of the sixteen CA bits in the first four unit intervals.

In some implementations, one or more parity bits of the first set of parity bits may be sent in one or more spare bits of the CA bus 420. For example, the host device 110 may transmit the CA word and the first set of parity bits over multiple unit intervals, where at least one of the unit intervals includes a transmission of one or more CA bits of the CA word and one or more parity bits. In one example, a transmission associated with a select unit interval may include three CA bits (e.g., using the first three CA pins of the CA bus 420) and may include one parity bit in a spare bit of the CA bus (e.g., a fourth CA pin of the CA bus 420). In some implementations, each parity bit of the first set of parity bits may be transmitted using the spare bits of the CA bus 420. In some implementations, the host device 110 may transmit the CA word and the first set of parity bits using a combination of the above. For example, the host device 110 may transmit a portion of the first set of parity bits via the spare bits of the CA bus 420 (e.g., with the CA bits) and may transmit another portion of the first set of parity bits via the CA bus 420 during one or more other unit intervals (e.g., separate from the CA word).

As shown by reference number 430, the memory device 120 may receive the first set of parity bits from the host device 110. For example, the memory device 120 may receive the first set of parity bits from the host device 110 via the CA bus 420. Additionally, the memory device 120 may receive the CA word from the host device 110 via the CA bus 420. In some implementations, the memory device 120 may receive the first set of parity bits separately from the CA word. For example, the memory device 120 may receive the CA word via the CA bus 420 during two or more unit intervals, and may receive the first set of parity bits via the CA bus 420 during one or more other unit intervals (e.g., after receiving the CA word). In some implementations, the memory device 120 may receive at least a portion of the first set of parity bits simultaneously with the CA bits. For example, the memory device 120 may receive one or more parity bits, of the first set of parity bits, via one or more spare bits of the CA bus 420. In some implementations, the memory device 120 may generate the CA word based on receiving the CA bits (during two or more unit intervals) and/or may generate the first set of parity bits based on receiving the one or more parity bits (during one or more unit intervals). For example, the memory device 120 may receive the CA bits and the one or more parity bits via the CA bus 420, may buffer the CA bits and the one or more parity bits, and may rebuild the CA word and the first set of parity bits based on the CA bits and the one or more parity bits, respectively.

As shown by reference number 435, the memory device 120 may generate a second set of parity bits. For example, the parity component 270 associated with the memory device 120 may generate the second set of parity bits based on the CA word. The second set of parity bits may include any number of parity bits. For example, the parity component 270, to generate the second set of parity bits, may generate any number of parity bits (e.g., four parity bits or six parity bits) based on applying a parity generation algorithm to the CA word (e.g., to the entirety of the CA word). The memory device 120 and/or the parity component 270 may generate the second set of parity bits, based on the CA word, using any type of parity generation technique or algorithm, such as the Hamming Code of the CRC algorithm described herein. In some implementations, the memory device 120 (and/or the parity component 270) may use the same parity generation technique or algorithm as the host device 110 (and/or the parity component 340). For example, the host device 110 may generate the first set of parity bits using a select parity generation technique or algorithm, and the memory device 120 may generate the second set of parity bits using the same select parity generation technique or algorithm.

In some implementations, the parity component 270 associated with the memory device 120 and/or the parity component 340 associated with the host device 110 may be configured to use multiple parity techniques or algorithms. For example, the parity component 340 may be configured to generate the first set of parity bits, and the parity component 270 may be configured to generate the second set of parity bits, using the Hamming Code or the CRC algorithm. In some cases, the memory device 120 and the host device 110 may communicate regarding which of the parity generation techniques or algorithms is to be used to generate the first set of parity bits and/or the second set of parity bits. For example, the host device 110 may generate the first set of parity bits using a select parity generation algorithm (e.g., a CRC algorithm), and may instruct the memory device 120 to generate the second set of parity bits using the select parity generation algorithm (e.g., the CRC algorithm).

As shown by reference number 440, the memory device 120 may compare the first set of parity bits and the second set of parity bits. For example, the memory device 120 and/or the comparison component 280 may compare the first set of parity bits generated by the parity component 340 associated with the host device 110 and the second set of parity bits generated by the parity component 270 associated with the memory device 120. The comparison component 280 may determine whether the CA word received by the memory device 120 is valid based on comparing the first set of parity bits with the second set of parity bits. The comparison component 280 may determine that the CA word received by the memory device 120 is valid based on the first set of parity bits matching (e.g., being identical to) the second set of parity bits. Alternatively, the comparison component may determine that the CA word received by the memory device 120 is invalid (e.g., has one or more errors) based on the first set of parity bits not matching (e.g., not being identical to) the second set of parity bits. In one example, if the first set of parity bits includes the bits 101010, and the second set of parity bits includes the bits 101010, the comparison component 280 may determine that the CA word received by the memory device 120 is valid. Alternatively, if the first set of parity bits includes the bits 101010, and the second set of parity bits includes the bits 100010, the comparison component 280 may determine that the CA word received by the memory device 120 is invalid.

As shown by reference number 445, the memory device 120 may selectively transmit an alert signal. In some implementations, the memory device may selectively transmit the alert signal via an alert pin 450. The alert pin 450 may be a unidirectional pin (e.g., data pin) that carries signaling from the memory device 120 to the host device 110. For example, the alert pin 450 may be used to transmit signaling from the host device 120 to the memory device 110 based on the memory device 120 comparing the first set of parity bits and the second set of parity bits.

In some implementations, the alert signal may be associated with a fail flag. The fail flag may be set to a first state (e.g., an inactive state or "0") by default, and may be set to a second state (e.g., an active state or "1") based on the first set of parity bits not matching (e.g., being different than) the second set of parity bits. In this example, the memory device 120 may compare the first set of parity bits and the second set of parity bits. The memory device 120 may set the fail flag to the second state (e.g., may activate the fail flag) based on the first set of parity bits not matching the second set of parity bits. In this example, the memory device 120 may transmit the alert signal based on the first set of parity bits not matching the second set of parity bits, and the host device 110 may initiate a corrective action based on receiving an indication of the fail flag. This may alert the host device 110 of command faults and/or address faults on the package or silicon that affect the CA bus 420.

In some implementations, the alert signal may be associated with a valid flag. The valid flag may be set to the first state (e.g., the inactive state or "0") by default, and may be set to the second state (e.g., the active state or "1") based on the first set of parity bits matching the second set of parity bits. In this example, the memory device 120 may compare the first set of parity bits and the second set of parity bits. The memory device 120 may set the valid flag to the second state (e.g., may activate the valid flag) based on the first set of parity bits matching the second set of parity bits. In this example, the memory device 120 may transmit the alert signal based on the first set of parity bits matching the second set of parity bits, and the host device 110 may initiate a corrective action based on not receiving an indication of the valid flag within a certain time period. For example, the host device 110 may initiate the corrective action based on not receiving the indication of the valid flag within a time period after transmitting the CA word. This may alert the host device 110 of command faults and/or address faults on the package or silicon that affect the CA bus 420. Additionally, this may alert the host device 110 to gross faults that affect the ability of the memory device 120 to receive commands. For example, the host device 110 may initiate the corrective action based on not receiving the indication of the valid flag within the time period, which may be a result of a gross fault within the memory device 120.

As shown by reference number 455, the host device 110 may perform the corrective action. In some implementations, the host device 110 and/or the corrective action component 350 may be configured to initiate one or more corrective actions based on the CA word being invalid. For example, the host device 110 may initiate the one or more corrective actions based on receiving the fail flag or based on not receiving the valid flag within the time period. Alternatively, the host device 110 and/or the corrective action component 350 may not initiate any corrective actions based on the CA word being valid. For example, the host device 110 may not initiate the one or more corrective actions based on not receiving the fail flag or based on receiving the valid flag within the time period.

In some implementations, the invalid CA word may result from the memory device 120 not receiving a command or not recognizing the command. This may result in the memory device 120 and/or the system 100 experiencing one or more errors. For example, the invalid CA word may result in the memory device 120 reading from a wrong address or writing to the wrong address. In the example of autonomous vehicles, the invalid CA word may decrease the safety of the vehicle associated with the memory device 120. In this case, the host device 110 and/or the corrective action component 350 may initiate one or more safety procedures, such as causing the autonomous vehicle to pull to the side of a road, to alert a driver of the vehicle to take manual control, or to initiate a restart or shut down procedure (e.g., if the vehicle is not currently being used). In another example, the corrective action component 350 may cause the host device 110 to attempt another transmission of the CA word to the memory device 120. This may improve the likelihood that the memory device 120 properly receives the CA word if the error occurred during the transmission over the CA bus and/or if the error was transient in nature. In this case, the system 100 may continue to operate without interruption.

As shown in the figure, the host device 110 and the memory device 120 may communicate via one or more buses. A bus may be a group of electrical lines or wires that can carry computer signals. The electrical lines may be categorized based on a function of the electrical line or the components associated with the electrical line. For example, power lines may provide electrical power to attached components, command lines may provide control for the synchronization and operation of the bus and its modules, address lines may designate the source or destination of a data signal, and data lines may carry data or instructions between components. As described herein, the CA bus may be a unidirectional bus for transmitting a CA word from the host device 110 to the memory device 120. Additionally, or alternatively, the host device 110 and the memory device 120 may communicate control signals, clock signals, data (DQ) signals, data strobe encoding (DQS) signals, or data mask inversion (DMI) signals, among other examples. The control signals may be used to set up communication channels between the host device 110 and the memory device 120 and to control the flow of data. For example, a control signal may be used by the host device 110 to indicate, to the memory device 120, which of the parity generation techniques or algorithms is to be used by the memory device 120 to generate the second set of parity bits. The clock signal may be a square wave signal that assists the memory device 120 and/or the host device 110 with timing and control. The DQ signal may be transmitted on every leading edge and/or on every falling edge of the clock, and the DQS signal may be used to help with timing and to improve jitter tolerance for the system 100. The DMI signal may be a bi-directional signal that is driven high to indicate that data on a data bus is inverted or that is driven low to indicate that the data is in a normal (e.g., non-inverted) state.

In some examples, the system 100 (e.g., the host device 110, the memory device 120, or both the host device 110 and the memory device 120 together) may be configured to satisfy a failure rate metric, such as to maintain a FIT rate for undetected failures that is below 0.4. In the context of memory operations, an undetected failure may result from the memory device 120 not receiving a command, not recognizing a command, reading from a wrong address, or writing to a wrong address, among other examples. In some cases, to satisfy the failure rate metric, the system 100 may employ data reliability techniques, such as on-die ECC, that reduce such failures. However, some of these data reliability techniques may not be able to identify command or address related. As a result, the FIT rates experienced by some memory devices may have greater than the undetected FIT rate threshold. This may result in the memory device and/or the system 100 experiencing one or more errors, which may be especially problematic in the case of autonomous vehicles, where an error in the memory device 120 may decrease the safety of the vehicle.

Using the techniques and apparatuses described herein, the number of undetected failures in the system 100 may be reduced. Specifically, the number of undetected failures resulting from communications on the CA bus 420 may be reduced. For example, the host device 110 may generate a CA word associated with a command signal or an address signal, and may generate a first set of parity bits based on the CA word using a select parity generation process. The host device 110 may transmit the CA word and the first set of parity bits to the memory device 120 via the CA bus 420. For example, the host device 110 may transmit the CA word via the CA bus 420 during two or more intervals and may transmit the first set of parity bits via the CA bus 420 during one or more other unit intervals. In another example, the host device 110 may transmit one or more bits of the first set of parity bits via one or more spare bits of the CA bus 420. The memory device 120 may generate a second set of parity bits, based on the CA word, using the select parity generation process (e.g., using the same parity generation process as the host device 110), and may compare the first set of parity bits and the second set of parity bits. The memory device 120 may selectively transmit an alert signal to the host device 110 (e.g., via the alert pin 450) based on comparing the first set of parity bits and the second set of parity bits. In some implementations, the alert signal may be associated with a fail flag, and the memory device 120 may activate the fail flag based on the first set of parity bits not matching the second set of parity bits. In other implementations, the alert signal may be associated with a valid flag, and the memory device 120 may activate the valid flag based on the first set of parity bits matching the second set of parity bits. The host device 110 may initiate a corrective action, such as a safety procedure, based on detecting that the CA word is invalid (e.g., based on the fail flag being activated or based on the valid flag not being activated within a time period). In the example automotive application, the host device 110 may cause the autonomous vehicle to pull to the side of a road or to alert a driver of the vehicle to take manual control. In another example, the host device 110 may attempt another transmission of the CA word to the memory device. The techniques described herein may improve the FIT rate for the system 100, such as by increasing the detection of errors associated with the CA bus 420, thereby improving the safety and reliability of the system 100.

As indicated above, FIG. 4 is provided as an example. Other examples may differ from what is described with regard to FIG. 4.

Figure 5:
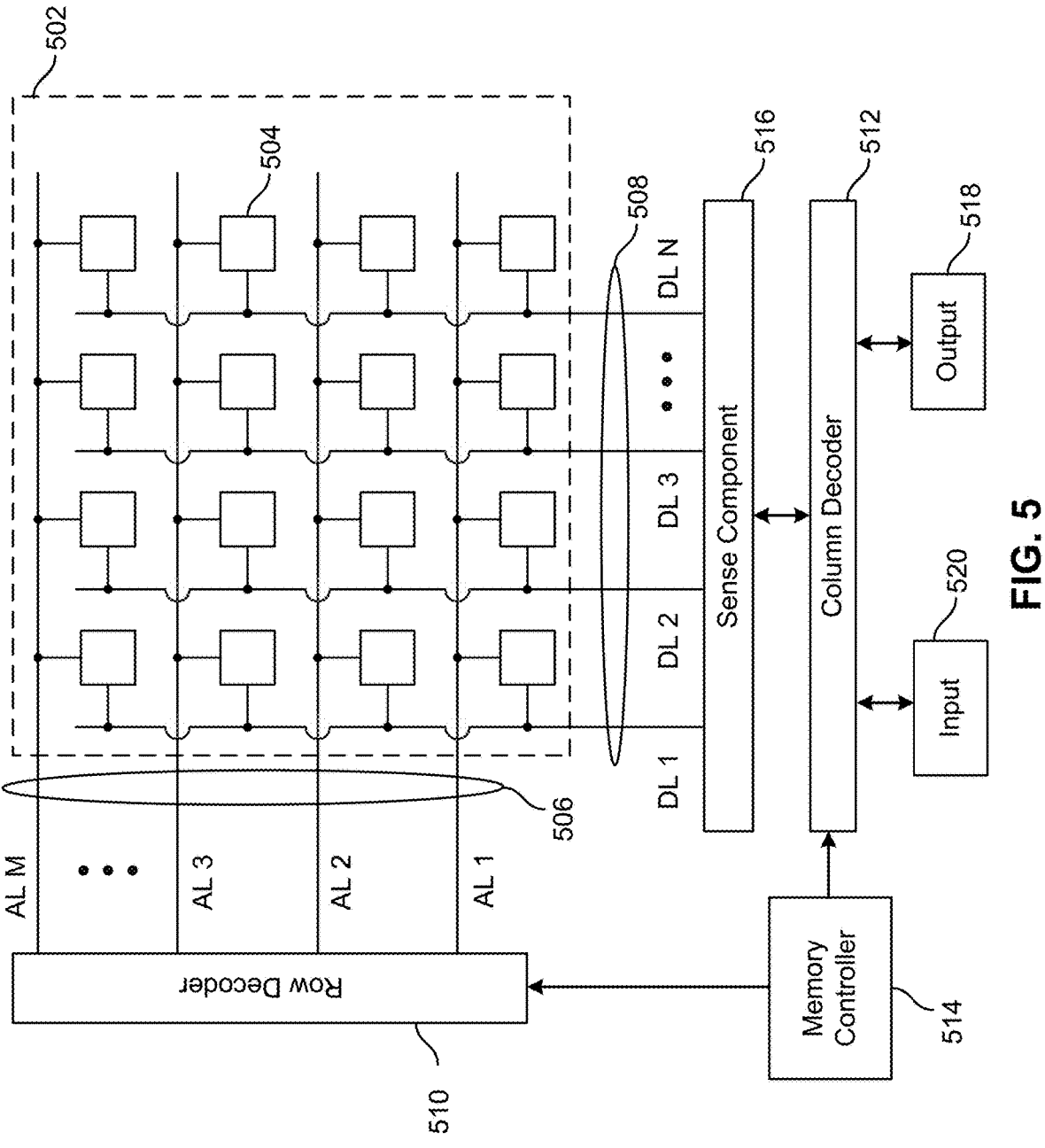
FIG. 5 is a diagrammatic view of an example memory device.

FIG. 5 is a diagrammatic view of an example memory device 500. The memory device 500 may include a memory array 502 that includes multiple memory cells 504. A memory cell 504 is programmable or configurable into a data state of multiple data states (e.g., two or more data states). For example, a memory cell 504 may be set to a particular data state at a particular time, and the memory cell 504 may be set to another data state at another time. A data state may correspond to a value stored by the memory cell 504. The value may be a binary value, such as a binary 0 or a binary 1, or may be a fractional value, such as 0.5, 1.5, or the like. A memory cell 504 may include a capacitor to store a charge representative of the data state. For example, a charged and an uncharged capacitor may represent a first data state and a second data state, respectively. As another example, a first level of charge (e.g., fully charged) may represent a first data state, a second level of charge (e.g., fully discharged) may represent a second data state, a third level of charge (e.g., partially charged) may represent a third data state, and so son.

Operations such as reading and writing (i.e., cycling) may be performed on memory cells 504 by activating or selecting the appropriate access line 506 (shown as access lines AL 1 through AL M) and digit line 508 (shown as digit lines DL 1 through DL N). An access line 506 may also be referred to as a "row line" or a "word line," and a digit line 508 may also be referred to a "column line" or a "bit line." Activating or selecting an access line 506 or a digit line 508 may include applying a voltage to the respective line. An access line 506 and/or a digit line 508 may comprise, consist of, or consist essentially of a conductive material, such as a metal (e.g., copper, aluminum, gold, titanium, or tungsten) and/or a metal alloy, among other examples. In FIG. 5, each row of memory cells 504 is connected to a single access line 506, and each column of memory cells 504 is connected to a single digit line 508. By activating one access line 506 and one digit line 508 (e.g., applying a voltage to the access line 506 and digit line 508), a single memory cell 504 may be accessed at (e.g., is accessible via) the intersection of the access line 506 and the digit line 508. The intersection of the access line 506 and the digit line 508 may be called an "address" of a memory cell 504.

In some implementations, the logic storing device of a memory cell 504, such as a capacitor, may be electrically isolated from a corresponding digit line 508 by a selection component, such as a transistor. The access line 506 may be connected to and may control the selection component. For example, the selection component may be a transistor, and the access line 506 may be connected to the gate of the transistor. Activating the access line 506 results in an electrical connection or closed circuit between the capacitor of a memory cell 504 and a corresponding digit line 508. The digit line 508 may then be accessed (e.g., is accessible) to either read from or write to the memory cell 504.

A row decoder 510 and a column decoder 512 may control access to memory cells 504. For example, the row decoder 510 may receive a row address from a memory controller 514 and may activate the appropriate access line 506 based on the received row address. Similarly, the column decoder 512 may receive a column address from the memory controller 514 and may activate the appropriate digit line 508 based on the column address.

Upon accessing a memory cell 504, the memory cell 504 may be read (e.g., sensed) by a sense component 516 to determine the stored data state of the memory cell 504. For example, after accessing the memory cell 504, the capacitor of the memory cell 504 may discharge onto its corresponding digit line 508. Discharging the capacitor may be based on biasing, or applying a voltage, to the capacitor. The discharging may induce a change in the voltage of the digit line 508, which the sense component 516 may compare to a reference voltage (not shown) to determine the stored data state of the memory cell 504. For example, if the digit line 508 has a higher voltage than the reference voltage, then the sense component 516 may determine that the stored data state of the memory cell 504 corresponds to a first value, such as a binary 1. Conversely, if the digit line 508 has a lower voltage than the reference voltage, then the sense component 516 may determine that the stored data state of the memory cell 504 corresponds to a second value, such as a binary 0. The detected data state of the memory cell 504 may then be output (e.g., via the column decoder 512) to an output component 518 (e.g., a data buffer). A memory cell 504 may be written (e.g., set) by activating the appropriate access line 506 and digit line 508. The column decoder 512 may receive data, such as input from input component 520, to be written to one or more memory cells 504. A memory cell 504 may be written by applying a voltage across the capacitor of the memory cell 504.

The memory controller 514 may control the operation (e.g., read, write, re-write, refresh, and/or recovery) of the memory cells 504 via the row decoder 510, the column decoder 512, and/or the sense component 516. The memory controller 514 may generate row address signals and column address signals to activate the desired access line 506 and digit line 508. The memory controller 514 may also generate and control various voltages used during the operation of the memory array 502.

As indicated above, FIG. 5 is provided as an example. Other examples may differ from what is described with respect to FIG. 5.

FIG. 6 is a flowchart of an example method 600 associated with command address fault detection. In some implementations, a memory device (e.g., memory device 120) may perform or may be configured to perform one or more process blocks of FIG. 6. In some implementations, another device or a group of devices separate from or including the memory device (e.g., the system 100 and/or the host device 110) may perform or may be configured to perform one or more process blocks of FIG. 6. Additionally, or alternatively, one or more components of the memory device (e.g., the controller 130 and/or the parity component 270) may perform or may be configured to perform one or more process blocks of FIG. 6.

As shown in FIG. 6, the method 600 may include receiving, from a host device via a CA bus, a plurality of CA bits associated with a command signal or an address signal (block 610). As further shown in FIG. 6, the method 600 may include receiving, from the host device via the CA bus, a first set of parity bits (block 620). The first set of parity bits may be based on the plurality of CA bits and a select parity generation process. As further shown in FIG. 6, the method 600 may include generating a second set of parity bits, based on the plurality of CA bits, using the select parity generation process (block 630). As further shown in FIG. 6, the method 600 may include comparing the first set of parity bits and the second set of parity bits (block 640). As further shown in FIG. 6, the method 600 may include selectively transmitting an alert signal to the host device based on comparing the first set of parity bits and the second set of parity bits (block 650).

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein, such as the operations described in connection with FIG. 4.

In some implementations, a memory device includes one or more components configured to: receive, from a host device via a CA bus, a plurality of CA bits associated with a command signal or an address signal; receive, from the host device via the CA bus, a first set of parity bits, wherein the first set of parity bits is based on the plurality of CA bits and a select parity generation process; generate a second set of parity bits, based on the plurality of CA bits, using the select parity generation process; compare the first set of parity bits and the second set of parity bits; and selectively transmit an alert signal to the host device based on comparing the first set of parity bits and the second set of parity bits.

In some implementations, a system comprising: a host device configured to: transmit, to a memory device via a CA bus, a plurality of CA bits associated with a command signal or an address signal; generate a first set of parity bits, based on the plurality of CA bits, using a select parity generation process; and transmit, to the memory device via the CA bus, the first set of parity bits; and the memory device, wherein the memory device is configured to: receive, from the host device via the CA bus, the plurality of CA bits; receive, from the host device via the CA bus, the first set of parity bits; generate a second set of parity bits, based on the plurality of CA bits, using the select parity generation process; compare the first set of parity bits and the second set of parity bits; and selectively transmit an alert signal to the host device based on comparing the first set of parity bits and the second set of parity bits.

In some implementations, a method performed by a memory device includes receiving, from a host device via a CA bus, a plurality of CA bits associated with a command signal or an address signal, receiving, from the host device via the CA bus, a first set of parity bits, wherein the first set of parity bits is based on the plurality of CA bits and a select parity generation process; generating a second set of parity bits, based on the plurality of CA bits, using the select parity generation process; and transmitting an alert signal to the host device, via an alert pin that is separate from the CA bus, based on comparing the first set of parity bits and the second set of parity bits.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   one or more components configured to:
      receive, from a host device via a command address (CA) bus, a CA word that includes a plurality of bits;
      receive, from the host device via the CA bus, a first set of parity bits corresponding to the CA word;
      generate a second set of parity bits based on applying a parity generation process to the CA word; and
      determine whether to transmit a signal to the host device based on a comparison of the first set of parity bits and the second set of parity bits.

2. The memory device of claim 1, wherein the first set of parity bits is generated based on applying a select parity generation process to the plurality of bits of the CA word.

3. The memory device of claim 1, wherein the CA word is conveyed via a command signal or an address signal.

4. The memory device of claim 1, wherein the signal is associated with transmission via a dedicated pin that is separate from the CA bus.

5. The memory device of claim 1, wherein the one or more components are further configured to activate a first flag based on the first set of parity bits not matching the second set of parity bits and activate a second flag based on the first set of parity bits matching the second set of parity bits.

6. The memory device of claim 1, wherein the one or more components are configured to receive a first portion of the CA word during a first unit interval.

7. The memory device of claim 6, wherein the one or more components are configured to receive a second portion of the CA word during the first unit interval.

8. The memory device of claim 6, wherein the one or more components are configured to receive a second portion of the CA word during a second unit interval.

9. The memory device of claim 1, wherein the one or more components are configured to receive the CA word using two or more CA pins associated with the CA bus.

10. The memory device of claim 1, wherein the one or more components are configured to receive the CA word via one or more spare bits of the CA bus.

11. The memory device of claim 1, wherein the CA word and the first set of parity bits are received during at least one different unit interval.

12. A system comprising:

a host device configured to:
    transmit, to a memory device via a command address (CA) bus, a CA word that includes a plurality of bits;
    generate a first set of parity bits corresponding to the CA word; and
    transmit, to the memory device via the CA bus, the first set of parity bits; and
the memory device, wherein the memory device is configured to:
    generate a second set of parity bits based on applying a parity generation process to the CA word; and
    determine whether to transmit a signal to the host device based on a comparison of the first set of parity bits and the second set of parity bits.

13. The system of claim 12, wherein the host device is further configured to:

receive the signal based on the first set of parity bits not matching the second set of parity bits; and identify an error associated with the CA word based on receiving the signal.

14. The system of claim 12, wherein the host device is further configured to:

identify an error associated with the CA word based on not receiving the signal, wherein the signal is associated with the first set of parity bits matching the second set of parity bits.

15. The system of claim 12, wherein the host device is configured to initiate a corrective action based on reception of the signal from the memory device or based on a failure to receive the signal from the memory device.

16. The system of claim 15, wherein the corrective action includes a retransmission of the CA word to the memory device.

17. The system of claim 15, wherein the corrective action includes transmission of an alert.

18. A method performed at a memory device, comprising:

receiving, from a host device via a command address (CA) bus, a CA word that includes a plurality of bits;

receiving, from the host device via the CA bus, a first set of parity bits corresponding to the CA word;

generating a second set of parity bits based on applying a parity generation process to the CA word; and transmitting a signal to the host device based on a comparison of the first set of parity bits and the second set of parity bits.

19. The method of claim 18, wherein the signal is associated with a dedicated pin for transmission.

20. The method of claim 19, wherein the dedicated pin is not included in the CA bus.

\* \* \* \* \*